United States Patent [19]

Akao

[11] Patent Number: 4,661,401
[45] Date of Patent: Apr. 28, 1987

[54] LAMINATED FILMS

[75] Inventor: Mutsuo Akao, Minami-ashigara, Japan

[73] Assignee: Fuji Photo Film Co., Ltd., Kanagawa, Japan

[21] Appl. No.: 713,795

[22] Filed: Mar. 20, 1985

[30] Foreign Application Priority Data

Mar. 21, 1984 [JP] Japan .................................. 59-52184

[51] Int. Cl.$^4$ ...................... B32B 3/26; B32B 7/02; B32B 7/12; B32B 27/32
[52] U.S. Cl. ..................................... 428/215; 428/216; 428/317.1; 428/317.7; 428/319.9; 428/516; 428/910
[58] Field of Search ............... 428/316.6, 317.1, 317.3, 428/317.5, 317.7, 319.7, 319.9, 215, 216, 910, 214, 516

[56] References Cited

U.S. PATENT DOCUMENTS

| 4,533,578 | 8/1985 | Boyd et al. | 428/319.9 |
|---|---|---|---|
| 4,565,733 | 1/1986 | Akao | 428/215 |

FOREIGN PATENT DOCUMENTS

| 2087309 | 5/1982 | United Kingdom | 428/317.1 |
|---|---|---|---|
| 2117536 | 10/1983 | United Kingdom | 428/317.1 |
| 2119707 | 11/1983 | United Kingdom | 428/200 |

Primary Examiner—William J. Van Balen
Attorney, Agent, or Firm—Burns, Doane, Swecker & Mathis

[57] ABSTRACT

A laminated film comprising a foamed sheet, having a molecularly-oriented thermoplastic resin film layer laminated onto one side of the foamed sheet and a low-pressure-processed, linear low-density polyethylene (L-LDPE) film layer laminated onto the other side of the foamed sheet, wherein:

said foamed sheet has a thickness of 0.3 to 2.0 mm and a foaming magnification of 5 to 50 times, said molecularly-oriented thermoplastic resin film has a thickness of 5 to 120 microns, and said L-LDPE film layer has a thickness of 13 to 120 microns, the latter two being melt-bonded to each sides of said foamed sheet through adhesive layers, respectively; and the resultant laminated film has a thickness reduced to 25 to 85% of the theoretical sum of the individual original layers.

The laminated film may comprise light shielding substance, which is suitable for packaging photosensitive materials.

15 Claims, 7 Drawing Figures

LAMINATED FILMS

TECHNICAL FIELD

The present invention relates to a laminated film suitable for the packaging of light-sensitive materials, especially, photosensitive materials.

TECHNICAL BACKGROUND

Various types of laminated films have widely been used in practical fields, and have been required to possess diverse properties according to use. The properties required for many packaging films incuding photosensitive materials are that they are hard to curl, have large impact resistance and flexibility, are susceptible to heat sealing for sealing, and the like. The realization of seal-packageable and anti-curling laminated films having improved resistance to impact without deteriorating certain properties such as cushioning, antistatic properties and slip properties would offer new availability, for instance, finding use in the packaging of photosensitive materials with such laminated films, said photosensitive materials having so far been packaged in sealed metallic containers with the associated caps for transportation. In addition, such laminated films are expected to offer practical advantages, e.g., be effective in reductions in weight of packages and prevention of breakage thereof. The present invention is a selectively improved one of the invention disclosed in prior U.S. Pat. No. 4,565,733.

OBJECT OF THE INVENTION

An object of the present invention is to provide a novel laminated film suitable for packaging.

It is a further object of the present invention to provide a laminated film which meets various requirements hereinabove mentioned for use in packaging light-sensitive materials, particularly, photosensitive films. Our objects will become apparent in the entire disclosure.

SUMMARY OF THE DISCLOSURE

More specifically, the present invention provides a laminated film comprising a laminated film comprising a foamed sheet, a molecularly oriented thermoplastic resin film layer laminated onto one side of the foamed sheet and a low-pressure-processed, linear low-density polyethylene (L-LDPE) film layer laminated onto the other side of the foamed sheet, wherein:
  (a) said foamed sheet has a thickness of 0.3 to 2.0 mm and a foaming magnification of 5 to 50 times,
  (b) said molecularly-oriented thermoplastic resin film has a thickness of 5 to 120 microns, and
  (c) said L-LDPE film layer has a thickness of 13 to 120 microns, the latter two being melt-bonded to each sides of said foamed sheet through adhesive layers, respectively; and
  (d) the resultant laminated film has a thickness reduced to 25 to 85% of the theoretical sum of the individual original layers.

The laminated film has a total thickness compressed or reduced to 25 to 85%, preferably 35 to 70% (residual thickness ratio) of the theoretical sum of the individual original constituent layers through melt-bonding.

Figure 1:
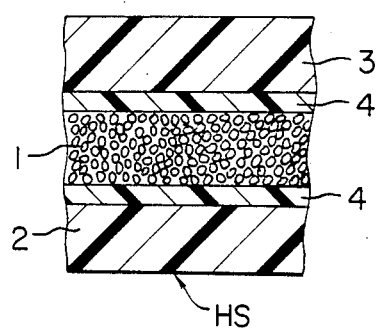
FIG. 1 is a partly sectional view of one embodiment (the basic structure) of the laminated films according to the present invention.
Figure 2:
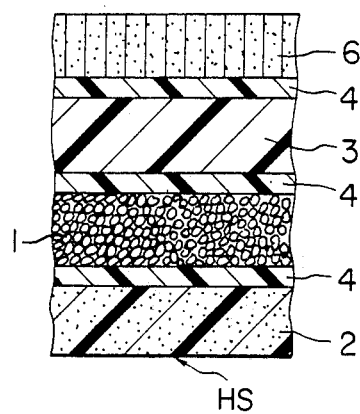
FIGS. 2 and 3 are sectional views of other embodiments.
Figure 3:
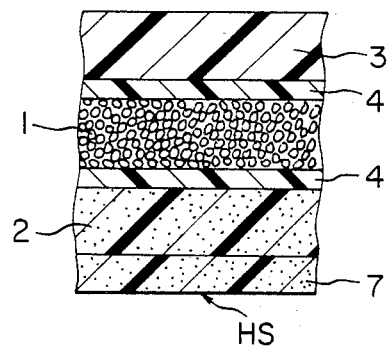

In the Figures, the reference numerals and symbols represent as follows:
  1. foamed sheet layer
  2. L-LDPE film layer
  3. molecule-oriented thermoplastic resin film layer
  4. adhesive layer
  5. heat-resistant flexible sheet layer (e.g., paper)
  5a. metal-plated flexible thin sheet layer
  6. heat-resistant flexible sheet layer (e.g., paper)
  7. heat seal layer
  Numbers within a circle mean the layers contain light-shielding materials.
  S. sealed part by heat seal or adhesive
  A. outer sheet
  B. inner sheet
  C. light-sensitive material
  D. folded adhesive joint of sealed part (using adhesive)
  E. folded adhesive joint of sealed part (using tape)
  HS. heat seal surface.

DETAILED DESCRIPTION OF THE PREFERRED EMBODIMENTS

The foamed sheet of the present invention may, for example, be formed of foamed sheets of thermoplastic resins composed of one, or a mixture, of polystyrenes, olefinic polymers such as polypropylenes, polyethylenes, polybutenes and the like, olefinic copolymers such as ethylene-propylene copolymers, ethylene-butene copolymers, ethylene-vinyl acetate copolymers, ethylene-acrylate copolymers and the like, polymers composed mainly of ethylene derivatives such as chlorinated polyethylene, copolymers composed mainly of propylenes, polyacetal, polycarbonate, polyphenylene oxide and the like. In addition, the sheet-like materials may be formed of foamed sheet of rubber such as polyurethane, natural rubber (obtained from the latex as the starting liquid of rubber in the spongy form), SBR and the like, or of mixtures composed mainly of such rubber with other plastics and rubber. However, the sheet-like foamed materials, to which the process of the present invention is effectively applied, are formed of foamed sheets of thermoplastic resins substantially composed mainly (preferably 50% by weight or more of polystyrene, high-, medium- and low-density polyethylenes, low-pressure-processed, low-density polyethylene (L-LDPE) and polypropylene.

A thickness suitable for use in packaging materials is 0.3 mm to 2.0 mm. While it is possible to produce laminated films having a larger thickness for other purposes, laminated films of 2 mm or more in thickness tend unavoidably to suffer interlaminar separation and deterioration in heat sealability, when they are used for bags.

In a thickness of less than 0.3 mm, the foamed sheet does not sufficiently produce its own effect, and heat melting leads to the possibility that all the pores may disappear. Besides, there arise problems with respect to stiffness, curling, Gelbo test strength and impact perforation strength (or extent of impact perforation).

Typical of commercially available sheet-like formed materials as the foamed sheet are "foamed polyethylene sheets" represented by High-Sheet of High Sheet Kogyo, Softlon S and Lightlon S of Sekisui Chemical Co., Ltd., Cellhope of Tokyo Chemical Industry Co., Ltd., Esaform S of Asahi Dow Chemical Co., Miramat of Nippon Styrene Paper, Foam-Ace L of Furukawa Electric Co., Ltd., Finecell of Hitachi Chemical Co., Ltd., PE Sun Foam of Sanwa Kako and PE Light of MTP Kasei; "foamed polypropylene sheets" represented by Torepef of Toray Industries Inc. and Hatsuport of Mitsui Toatsu Chemicals, Inc.; "foamed polystyrene sheets" Stylofoam of Asahi Dow, Styrene Paper of Nippon Styrene Paper, Esrene Sheet of Sekisui Kasei, Korparu of Korparu, Kanefan of Kanegafuchi Chemical Industry Co., Ltd., etc.; and "foamed polychloride vinyl sheets" represented by Nippi Foam of Nippi. However, particular preference is given to the foamed polystyrene sheet (foamed polystyrene paper) and the foamed polyethylene sheet in view of cost and properties. Generally are preferred foamed sheets comprised of polyethylene, polystyrene, polyurethane, or copolymers thereof; copolymers or blends thereof with other resins (preferably the other resins being included less than 50% by weight, most preferably less than 10% by weight). The other resins embrace substantially the thermoplastic resins which can be made to foamed sheets with said polymers or copolymers.

The foaming magnification (factor) has a large influence upon cushioning, slip properties and mechanical strength, and may be selected depending upon the purpose of products, and is suitably 5 to 50 times (preferably 10 to 30 times).

A foaming magnification of exeeding 50 times causes a significant drop of the strength of the foamed sheet per se, which is attributable to interlaminar separation.

In a foaming magnification of less than 5, impact resistance; and, inter alia, Gelbo test strength drop, and other properties are lost to an extent that the foamed sheet loses its own effect, and approaches the general film.

The term "molecularly-oriented films" refers to those formed of polyethylenes, polypropylenes, polyester, polyamides (various nylons), polycarbonate, polyvinylidene chloride, polyvinyl chloride, polystyrene, etc., or copolymers containing such polymers as the main component, or mixtures of two or more of such thermoplastic resins. Preference is given to high-density polyethylene, medium-density polyethylene, low-density polyethylene, polypropylene, polyester and nylon, but particular preference is given to high-density polyethylene having a density of 0.945 g/cm³. If a resin is used for this layer, which has a melting point higher than that of the L-LDPE heat-sealing layer the opposite side by 10° C. or more, heat-sealing is then made easy, thus presenting a practical advantage. Most generally, uni- or bi-axially stretching is employed for molecular orientation. The resin composition, degree of molecular orientation, magnification of stretch, thickness, etc., of the molecularly-oriented film may properly be selected depending upon the L-LDPE film layer to be heat-sealed and the articles to be wrapped.

The wording "uniaxially molecularly-oriented films" referred to herein shall encompass films with the rate of molecular orientation in the molecular direction being higher than that in the direction at right angles therewith by a magnification of 1.5 times or more. For instance, a film inflated at a blow-up ratio of 2 and longitudinally stretched three times is taken as being a longitudinally three-times uniaxially stretched film.

Generally, the uniaxially molecularly-oriented films refer to (laterally or longitudinally) stretched films (obtained by means of a tenter). In the present invention, however, that wording shall embrace physically shaped (embossed) or inflation films (tubular films) that are molecularly oriented in an increased blow-up ratio as well as flat films that are strongly molecularly-oriented in the longitudinal direction, and then spirally cut for oblique molecular orientation (e.g., 45°). Known examples of the production of uniaxially molecularly-oriented (stretched) films are for instance disclosed in Japanese Patent Kokai-Publicaton Nos. 47-34656 and 48-100464 (corresponding to B. P. 1414681 and U.S. Pat. No. 3,891,374) as well as Japanese Patent Kokoku-Publication Nos. 40-5319, 47-38621, 47-39927 as 53-18072, the disclosure whereof are herein incorporated by reference thereto.

Molecular orientation may be effected in any one of the longitudinal, lateral and oblique directions.

The degree of molecular orientation and stretch may be selected depending upon the resin composition and the use of the product, and no particular limitation is imposed thereupon. However, a noticeable stretching effect is achieved, when the magnification of stretch is in a range of 2 to 15 times. In the case where the light-shielding substance is contained, it is preferred that the magnification of stretch is in a range of 2 to 7 times in view of the quality of films expressed in terms of the occurrence of fisheyes.

The thickness of the films may be selected depending upon the purpose, but may be in a range of generally 5 to 120 microns, most preferably 8 to 70 microns, for the purpose of packaging materials.

The wording "low-pressure-processed, linear low-density polyethylene (L-LDPE)" used herein and disposed on the heat-seal side refers to a copolymer of ethylene and an alpha-olefin having 3 to 13, preferably 4 to 10, carbon atoms, said copolymer including a short branch on its linear straight chain. In the present invention, suitable are the copolymers having an ethylene content of 80 to 99.5 mole % and an alpha-olefin content of 0.5 to 20 mole %. The low-pressure-processed, linear low-density polyethylene (L-LDPE) is generally produced by the low-pressure process, and is supposed to have a low to medium density. However, the polymer used in the present invention, in most cases, has a density ranging from 0.91 to 0.95 g/cm³, preferably from 0.91 to 0.94 g/cm³.

The L-LDPE used has a melt index (MI at 190° C.) of 0.2 to 40 g/10 min. The alpha-olefins used embrace butene-1, octene-1, hexene-1, 4-methylpentene-1, etc. Preferably, the use of 4-methylpentene-1, hexene-1 and octene-1 leads to improvements in physical strength. More concretely, L-LDPE used in the present invention is commercially available under the trade names of UNIPOLE (UCC), DOWLEX (Dow Chemical), MARLEX (Phillips), SOLAIR (Du Pont, Canada), ULTZEX (Mitsui Petrochemical), STAMYLEX (DSM), and such. Preferable is inter alia an L-LDPE having an ethylene content of 90 to 99.5 mole %, an alpha-olefin content of 0.5 to 10 mole %, a melt index of 0.4 to 15 g/10 min and a density of 0.91 to 0.94 g/cm$^3$, said alpha-olefin being hexene-, 4-methylpentene-1, or octene-1 and corresponding to, e.g., ULTZEX (Mitsui Petrochemical), DOWLEX (Dow Chemical) or STAMYLEX (DSM).

Reference is made to the low-pressure-processed, linear low-density polyethylene (L-LDPE) film that is a laminating film suitable for the packaging of photosensitive materials, and is adapted to be heat-sealed.

The light-shielding layer comprises a polyethylenic polymer and 0.3% by weight or more of a light-shielding substance. The figure of 0.3% indicates the minimum amount of the light-shielding substance required for the light-shielding layer to ensure its light-shielding properties. In view of the high sealing strength, strength on the addition of carbon, rigidity, slip properties, etc. to be described in detail later, it is then preferred that the polyethylenic polymer contains 45% by weight or more of the low-pressure-processed, linear low-density polyethylene (L-LDPE).

It is desired that the remainder (referred to as the additives) of the polyethylenic polymer, other than L-LDPE, is substantially constituted by high-pressure-processed, low-density polyethylene (LDPE). To this end, use may be made of any thermoplastic resin capable of being kneaded with L-LDPE.

The thermoplastic resin additives used include polyethylenes (HDPE, MDPE, LDPE), copolymers of ethylene with other polymers (ethylene-ethyl acrylate copolymers=EEA, ethylene-vinyl acetate copolymers-=EVA, etc), ionomer resins, polystyrene, polybutylene, polypropylenes (PP), various thermoplastic elastomers, chlorinated polyethylene and the like, and may be used alone or in combination.

However, the polyolefinic resins are desired in view of improvements in physical properties, and it is desired to use, alone or in combination, thermoplastic resins such as LDPE, MDPE, HDPE, PP, EEA, EVA, ionomers, various thermoplastic elastomers, polybutene-1, etc.

One layer, i.e., the molecularly-oriented thermoplastic resin film layer, another layer, i.e., the L-LDPE film layer and a still another layer, i.e., the foamed sheet, are hot-melt bonded to one another with or without the use of hot-melt adhesive layers. Hot-melt bonding may also be done by means of solvent type adhesives. In this case, it is important that, by partial melting of the boundary surfaces of the foamed sheet, rather than mere bonding and lamination of the individual layers, the laminated film is compressed in such a manner that, after lamination, its thickness is smaller that the theoretical sum of the individual layers. The point to be noted in the regard is, however, that complete melting and compression of the foamed material to its core portion should be avoided, since a large portion of pores then disappears.

Accordingly, it is desired tha the compression rate of the laminated film expressed in terms of (1 − Thickness of Laminated Film/Theoretical Sum of Individual Layers' Thickness) ×100 is in a range of 15 to 75% (Residual Thickness Ratio: 85 to 25%), preferably 30 to 65% (Residual Thickness Ratio: 70 to 35%).

Over the films obtained by mere lamination of three layers of the same type, the laminated films compressed in this manner are further improved with respect to various properties such as prevention of interlaminar separation, a reduction in curl, improvement in flexibility, heat-sealability and production-suitability, reductions in wrinkling, unevenness of the thickness and the thickness of film rolls, and an increase in the length of film rolls, etc.

In a compression rate of below 15%, there arise problems such as incidence of interlaminar separation, difficulty encountered in heat-sealing, and unfavorable sealing-packageability due to poor fold behavior as well as wrinkling, thickness variations, increase in the thickness of film rolls, etc., with respect to the production of the laminated films. On the other hand, compression to a compression rate exceeding 75% provides some disadvantages such as drops of Gelbo test strength, impact resistance, tear strength, etc.

For achieving such hot-melt bonding, it is required to properly select the temperature of thermoplastic resin adhesive layers during bonding.

The temperature of thermoplastic resin adhesive layers used for extrusion process is in a range of preferably 230° to 380° C., more preferably 270° to 350° C.

If the temperature of thermoplastic resin adhesive layers is too high, the molecularly-oriented film layer or the stretched film layer or the L-LDPE film layer may undergo thermal shrinkage or melting, thus leaving behind voids or bores. There also arise problems such as decomposition or coloring of the thermoplastic resins for adhesive layers, and collapse of pores in the foamed sheet, which would result in the loss of cushioning, etc.

In the case where difficulty is involved in the bonding of the molecularly-oriented film to the foamed sheet, for instance, there is too large a difference between the melting temperatures of the foamed sheet, the molecularly-oriented film layer and the L-LDPE film layer, any known solvent type bonding agents or adhesives may be used.

Of such adhesives, those particularly suitable for the present invention are polyolefinic thermoplastic resin hot-melt adhesives such as polyethylenes, polypropylene and polybutene, thermoplastic resin hot-melt adhesives such as olefinic copolymers, e.g., ethylene-propylene copolymers, ethylene-vinyl acetate copolymers and ethylene-acrylate copolymers as well as ionomer resins, and other hot-melt type and solvent rubber type base adhesives. Even in this case, it is of importance that partial melting and compression of the surface layer of the foamed sheet is caused to occur without mere recourse to bonding with adhesives.

More concretely speaking, the polyolefinic adhesives include polyolefin polymers such as polyethylene, polypropylene, polybutylene and EPR, or copolymers thereof as well as copolymers of ethylene and other monomers such as low-pressure-processed, linear low-density polyethylene (L-LDPE), ionomer resins (ionic copolymers) such as Surlin (Du Pont) and Admer (Mitsui Polychemical) and graft polymers.

These adhesives should preferably have a melting point lower than those of the molecularly-oriented and L-LDPE film layers for lamination by at least 10° C.

Given such a difference in the melting point, complete hot-melt adhesion is achieved without having any adverse influence upon the molecularly-oriented and L-LDPE films. In the case where hot-melt adhesion is effected with another solvent type adhesive, use may be made of any known coating method of solvent type adhesives, which typically embrace dip coating, spray coating, air knife coating, curtain coating, roller coating, doctor coating, wire bar coating, slide coating, emboss-roll coating, extrusion coating with a hopper as disclosed in U.S. Pat. No. 2,681,294 specification and such. If required, two- or multi-stage coating may be carried out simultaneously by the procedures as disclosed in U.S. Pat. Nos. 2,761,791, 2,941,898 and 3,508,947 specifications as well as S. Harazaki "COATING KOGAKU (ENGINEERING)", Asakura Shoten, 1973, pp. 253. Out of these procedures, proper one may be selected depending upon the amount and rate of coating.

It is desired to apply a surface activating treatment to the surfaces of the respective layers according to the known manner, before other layers are applied thereto.

Surface activation may be carried out by anchor coating, etching by acid, flame treatment with a gas burner, or corona or glow discharge treatment. However, the corona discharge treatment may advantageously be used, as disclosed in U.S. Pat. Nos. 2,715,075, 2,846,727, 3,549,406 and 3,590,107 specifications, due to its low cost or convenience.

The laminated films of the present invention are particularly suitable for packaging photosensitive materials. For that purpose, at least one layer of the overall laminate is required to have light-shielding properties. To this end, the light-shielding substance may be incorporated in one or more of the molecularly-oriented film layer, the foamed sheet layer, the L-LDPE film layer, the adhesive layers and other layers. Alternatively, said one or more layers may be laminated with a light-shieldig layer(s) such as paper, or a metal sheet having a thickness of 5 to 50 microns, for instance, an aluminum foil, a zinc-plated thin steel plate, etc. Still alternatively, printing may be applied for the purpose of light-shielding.

A suitable amount of the light-shielding substance, if added, is in a range of 0.5 to 15 grams per unit area ($m^2$) of the overall laminate. The addition of the light-shielding substance to the stretched film in an amount exceeding 15 $g/m^2$ is unpreferred in that the occurrence of fisheyes generally lead to a drop of physical strength, etc. A preferable amount of the light-shielding substance to be incorporated is therefore in a range of 0.5 to 7% by weight except for the case of incorporating in the flexible sheets such as paper. The term "light-shielding substance" is intended to include any substance which does not transmit visible and ultraviolet radiation therethrough, and typically embraces various types of carbon black, aluminum powders or pastes, coloring pigments, coloring dyes, white pigments such as titanium oxide, barium sulfate, calcium carbonate and clay, various powdery metals, various fibrous metals and such. In respect of quality, cost and light-shielding power, carbon black, aluminum powders, aluminum pastes freed of low-volatile ingredients are preferred for the purpose of packaging photosensitive materials. Among a variety of carbon black, preference is given to the furnace type carbon black. It is then preferred that 1 to 15% by weight of the furnace type carbon black having a pH value of 7±2 (and preferably a particle size of no more than 35 millimicrons) is added to the L-LDPE layer, since its strength is improved rather than drops, unlike the LDPE film. Besides, the use of such carbon black is particularly preferred in that it is possible to limit or reduce the occurrence of fogging of photosensitive materials, fisheyes, etc.

Depending upon the resin used, the machine applied, the cost involved and the like, the light-shielding material is used in the form of powdery coloring agents, pasty coloring agents, masterbatches, dyes and pigments, and colored pellets.

The raw material of carbon black, one typical light-shielding material used in the present invention, is classified into gas black, oil furnace black, anthracene black, acetylene black, soot, pine soot, vegetable black, animal black, etc. In the present invention, furnace carbon black is desired in view of the light-shielding properties, cost and improvements in physical properties. It is also desired to use acetylene carbon black and Ketschen carbon black in the light-shielding substance which is costly, but produces an antistatic effect. If necessary, the former carbon black may preferably be mixed with the latter depending upon the required properties. As mentioned in the foregoing, the light-shielding materials may be incorporated into the polyethylenic polymer in various forms; however, masterbatching is desirous in view of the cost and for the purpose of preventing environmental pollution at working places, etc. For instance, Japanese Patent Kokoku Publication No. 40-26196 discloses a process for preparing a polymer/carbon black masterbatch by dispersing carbon black in a solution of a polymer in an organic solvent, and Japanese Patent Kokoku Publication No. 43-10362 teaches a process for preparing a masterbatch by dispersing carbon black in polyethylene.

In particular, the present invention will now be explained with reference to the masterbatching method, to which the invention is not exclusively limited, and in which carbon black is incorporated in the polyethylenic polymer.

First of all, carbon black is mixed with LDPE (high-pressure-processed, low-density polyethylene) in a high concentration of 2% by weight or higher, generally 10% by weight or higher, to form a masterbatch. The masterbatch is weighed in such a way that the carbon black content of the final product reaches the given value, and is mixed with L-LDPE.

In this method there are two merits. One is that mixing and dispersion are more easily effected, as compared with direct mixing of carbon black with L-LDPE, leading to a cutdown in the cost and the prevention of occurrence of fisheyes.

Another is that the combination system of LDPE and L-LDPE is superior to the sole system of LDPE in the processability on film preparation. In the present invention, the masterbatching resin is preferably a polyolefinic resin having a melt index higher than that of L-LDPE in view of uniform mixing. It is to be noted that this holds substantially for the use of other light-shielding substances.

With L-LDPE, the melt tensile stress and flowability have been said to pose certain problems in that the preparation of film therefrom does not only require larger energy than does the production of films from polyethylene, but design modification or even new installation of an inflation molding machine is also needed. In this connection, for instance, Japanese Patent Kokai Publication No. 55-117638 discloses a method for modifying the structure of a screw, which is designed to reduce the amount of load impressed thereon and heat generated by the revolution thereof.

Where 5% or higher of LDPE is contained, a conventional T-die or inflation molding machine can be used without making any modification thereto, according to the masterbatching method of the present invention.

From the standpoint of processability alone, the less the amount of L-LDPE, the better the result will be. However, if the amount of LDPE is above that of L-

LDPE in the present invention, carbon black produces no sufficient effect upon increases in strength. It is thus required that the amount of L-LDPE contained in the overall polyethylenic polymer be 45% or higher, preferably 50% or higher, and more preferbly 60% or higher. Although improvements in processability are achieved even by mere incorporation of LDPE into L-LDPE, yet the addition of the light-shielding substance makes a contribution to further increases in the bubble stability in combination with its own favorable influence.

On the other hand, the polymer blend system excels in physical properties, and is markedly improved in respect of tear strength, heat-seal strength and Gelbo test strength in particular.

The aforesaid low-pressure-processed, linear low-density polyethylene (L-LDPE) film layer may be formed of either a non-stretched film or a uniaxially or biaxially molecularly-oriented (or stretched) film. In particular, use may also be made of an inflation film having a blow-up ratio of at least 1.1 or a T-die film finished to a thickness smaller than that of the outlet of a slit. That film layer may be laminated directly onto the side of the foamed sheet layer to be heat-sealed. Alternatively, that film layer may separately be formed followed by lamination through an adhesive layer.

In the former case of direct lamination, the light-shielding layer has properly a thickness of 13 to 70 microns, more preferably 20 to 50 microns, and, in the latter case of post lamination, it has appropriately a thickness of 13 to 120 microns, more preferably 35 to 90 microns.

As the L-LDPE film layer containing a light-shielding substance excels in heat-seal strength, hot-tack strength (hot-seal strength) and tear strength, it provides a much stronger heat seal, as compared with the conventional high-pressure-processed, low-density polyethylene (LDPE), when they are applied in the same thickness.

It is also advantageous to laminate on the L-LDPE light-shielding film layer a heat-sealing layer having a melting point lower than that thereof.

In view of heat-seal properties, an additional advantage is obtained by using the L-LDPE light-shielding film layer per se as the heat-seal layer.

This tendency becomes significant especially if combined with the addition of carbon black as the light-shielding substance. The L-LDPE light-shielding film layer containing carbon black can provide a heat seal stronger than that of the conventional LDPE light-shielding film layer, even when the former is smaller in thickness than the latter.

According to another appreciable feature of the present invention, the light-shielding properties should be afforded to the heat-sealed layer so as to secure light-shielding of the packaging material for photosensitive materials (due to the fact that as the heat-sealed layer increases in thickness, light is more apt to penetrate through the section thereof). However, even if L-LDPE contains carbon black, then it does not serve to decrease strength, unlike LDPE. Rather, L-LDPE serves to improve strength, where it contains 1 to 15% of carbon black. Hence, the present invention is particularly useful as the packaging material for photosensitive materials, for which perfect light-shielding is required. To achieve satisfactory light-shielding properties with a thin layer is not only advantageous in the cost, but does also enable the suppression of rigidity, which results in improvements in the applicability with respect to an automatic packaging machine. The carbon black to be added to the L-LDPE light-shielding film layer begins to produce its own effect in an amount of at least 0.3%, and, with the increase in strength in mind, the amount of that carbon black is preferably in a range of 1 to 15% by weight. However, where it is particularly desired to improve light-shielding and antistatic properties, that carbon black may be added in an amount of 15 to 30% by weight. Together with or in place of carbon black, use may be made of inorganic and organic pigments, powdery metals, coloring agents, etc., which are known as the light-shielding substance. When the L-LDPE light-shielding film layer is used as the heat-seal layer, there is another advantage that increased seal strength is obtained just after heat-sealing. With L-LDPE, the sealed surface solidifies rapidly. For that reason, stretching and thinning of the sealed portion are avoided, and so it is unlikely that light-shielding properties and strength may deteriorate, or pin holes may occur; in other words, good hot-tack strength is obtained.

A further advantage of the L-LDPE light-shielding film layer according to the present invention is that surface strength is so high as to cause no occurrence of scratching. This is combined with the strength characteristics brought about by the addition of carbon black to prevent generation of black powders, contrary to the case of high-pressure-processed low-density polyethylene.

A still further advantage of the L-LDPE light-shielding layer lies in the slip properties thereof. When articles are inserted into bag materials, the less the coefficient of friction thereof, the easier the insertion is. Thus, it is unlikely that the articles may flaw, or the bag may break. This easy-to-insert-property is important especially where packaging is effected with an automatic packaging machine. As the articles increase in size and weight, such slip properties are required more and more. The L-LDPE layer used includes an angle of slide of 7° to 15° on the surface and, in this respect, is also superior to LDPE (18° to 25°).

While the three essential layers of the present invention, i.e., one molecularly-oriented film, one L-LDPE film and one foamed sheet, are as discussed above, other layers may be further laminated, upon carrying out the present invention.

For instance, the lamination of pliable sheets of 30 microns or more in thickness such as various paper, unwoven fabrics, cellophane, etc. are considered to result in improvements in heat sealability, strength, slip properties, antistatic properties, printability, light-shielding properties, appearance, etc. Other flexible sheets for lamination may include a variety of thermoplastic resin films. In particular, if the sheet used has a melting point higher than that of the molecularly-oriented (or stretched) film layer by 10° C. or more, it is then easy to heat-seal together the low-melting sides, resulting in the advantageous production of bags excelling in heat-seal properties.

The same effect is also obtained by forming an innermost layer (to be heat sealed) of an easily heat-sealable layer having a melting point lower than that of the outermost molecularly-oriented film by at least 10° C. The formation of the easily heat-sealable layer may rely upon either coating or lamination. When a polyester or nylon film is used for one outermost layer as the stretched film, a polyethylene film may be used for the innermost layer (to be heat-sealed) so as to achieve easier heat-sealing.

The lamination of the foregoing other pliable sheets onto the laminated films according to the present invention may rely upon the conventional methods involving, for example, the heat-bonding methods (hot plate-bonding, impulse bonding, high-frequency bonding and ultrasonic bonding), and the methods using bonding agents or adhesives (wet-laminating, dry-laminating, hot-melt laminating, extrusion laminating and coextrusion laminating, etc.).

The laminated films of the above-mentioned structure have excellent resistance to curling as well as improved tear strength, Gelbo test strength and drop strength, and so they are best-suited for use as the packaging materials.

The invented laminated films, when having light-shielding properties, are useful for the purpose of packaging photosensitive materials, especially the following photosensitive materials.

The term "photosensitive materials" used herein shall include photosensitive materials such as silver halide photographic materials, diazo photosensitive materials, photosensitive resins, self-developing type photosensitive materials and diffusion transfer type photographic materials and, in addition to such materials, any material that suffers discoloration, hardening or deterioration upon exposure to light.

Concretely mentioned are foodstuffs such as chocolate, margarine, miso (fermented pasty products of soybeans or the like), wine and beer, medicines, dyestuffs, and other chemicals such as developers and mordants for dyestuffs.

For the purpose of packaging photosensitive materials, the laminated films according to the present invention may be used in the form of a single-sheet flat bag, a double-sheet flat bag, a bag with a rectangular bottom, a self-supporting bag, single-sheet gussetted bag, a two-sheet gussetted bag, a film sheet, an initial lining for moistureproof boxes, and leader paper, and in other every known form.

Figure 4:
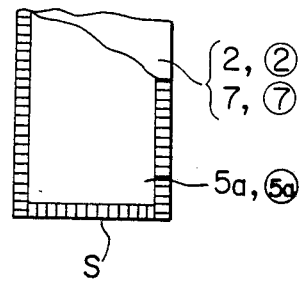
FIG. 4 is a partly cut-out perspective view of a flat bag made using the packaging material of the present invention.
Figure 5:
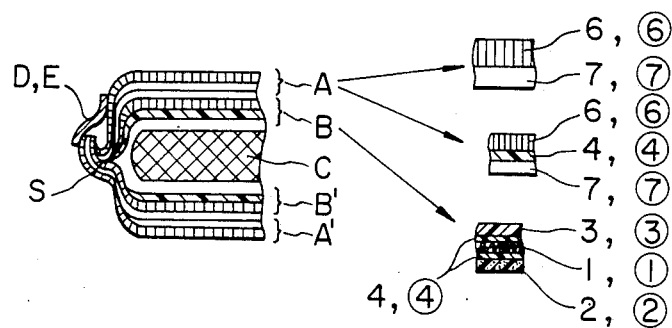
FIG. 5 is a sectional view of a double-sheet gussetted bag sealed therein with a photosensitive material, which is composed of an outer sheet and an inner sheet formed of the packaging material of the present invention.
Figure 6:
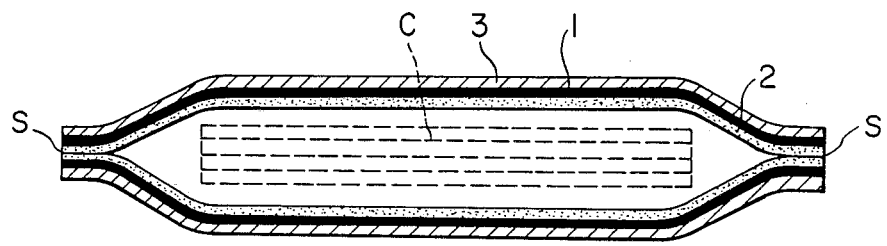
FIG. 6 is a sectional view of a completely sealed photosensitive material.

In accordance with the present invention, the article (a photosensitive material) may be rolled up by the present product with the molecularly-oriented film layer directed to outside and the L-LDPE light-shielding film layer directed to inside. Alternatively, a photosensitive material C is advantageously packaged or wrapped in various bags for complete light-shielding. Depending upon the nature of the laminated films used, bag-making may rely upon the known plastic film-sealing techniques such as heat-sealing, impulse sealing, ultrasonic sealing and high-frequency sealing. Bag-making may be effected with suitable adhesives, tackifiers, etc. In FIGS. 4 to 6, a capital S stands for the sealed portion. As illustrated in FIG. 4, the bag may be sealed entirely therearound. Alternatively, the bag may be sealed discretely or partly therearound.

Figure 7:
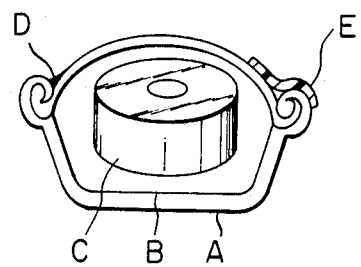
FIG. 7 is a schematically sectioned view of a rolled monochrome or color photosensitive material (photographic paper, cinefilms, printing use films, indirect X-ray films, microfilms, etc.) in packaged form.

The bag may be of every known or other form of the layer structure. Typically, single-sheet flat bags are illustrated in FIGS. 4 and 6, while double-sheet gussetted bags comprising inner and outer sheets are shown in FIGS. 5 and 7. FIG. 5 is a sectional view of a double-sheet gussetted bag packaging therein a photosensitive material in a sealed manner, wherein the outer sheet A is composed of a heat-resistant flexible sheet layer 6 of Clupack Kraft Paper of 73 g/m² to which a heat-seal layer 7 of a low-density polyethylene layer is extrusion-laminated to a thickness of 15 microns, and the inner sheet B is composed of the packaging material of the present invention (Invented Sample No. 1 enumerated in TABLE 1). This has the advantages that, due to its excellent impact perforation strength and drop strength as well as it complete heat sealability, there is no fear that the seal portion may break, and its suitable rigidity allows the open end to be easily rolled up and sealed with the use of a bonding agent or tape.

For instance, a 500 micron-thick foamed styrene sheet (having a foaming factor of 20) was laminated on the outer side (to be not heat-sealed) with a uniaxially and obliquely stretched high-density polyethylene film (having a thickness of 40 microns and a stretching magnification of 3.5 times and containing 3% of carbon black) and on the inner side with a low-pressure-processed, linear low-density polyethylene having a thickness of 50 micron and a blow-up ratio of 1.2 (ULTZ EX manufactured by Mitsui Petroleum Chemical Ind., Grade NO. 2020L, MI: 2.5 g/10 min., density: 0.923 g/cm³) (L-LDPE) film layer (the lamination of both film layers being achieved by extrusion process with the use of the hot-melt bonding layers of a high-pressure-processed, low-density polyethylene). The compression rate was 45 %. The laminated film is suitable for the packing of a sheet-like photosensitive material weighing 5 kg or more. This has the advantages that, owing to its excellent impact perforation strength and drop strength as well as its complete heat-sealability, there is no fear that the heat sealed portion may break, and its suitable rigidity permits the open end to be easily rolled up and sealed with the use of a bonding agent or tape.

This also holds for the packaging of a roll-film or photographic paper. So far, large-sized roll articles have been transported with metal-made sealing vessels (metal cans) with the associated lids or caps. Bags formed of film-like packaging materials having a smaller weight and advantageous to handle have been not practically used to this end, since there arose some problems that they were broken with the edges of the rolls or were holed by scratching or dropping.

According to the present invention, it has been found that, because of their excellent tear strength and Gelbo test strength, the invented materials are used with sufficient practicality for the transportation of large-sized roll articles (monochrome or color photographic paper, cinefilms or the like) only by heat-sealing them into bag-like packaging materials.

In what follows, detailed reference will be made to the optimum combination of materials, when uniaxially stretched high-density polyethylene films are used as the molecularly-oriented resin films. It is preferred that the magnification of stretch is 2 to 6 times, and the amount of carbon black to be incorporated is 1 to 7%. Thickness may be determined from within the range of no more than 120 microns depending upon the purpose, but the optimum thickness for the conventional purpose is 5 to 120 microns. It is to be noted that a preferable density is no less than 0.94 g/cm³.

The foamed sheet may be combined with any one of polyethylene, polypropylene and polystyrene, but the best adhesion is obtained, if the polyolefinic material is used as the adhesive layer. For the assurance of a proper compression rate, it is important that the bonding temperature is in a range of 250° to 380° C.

It is also preferable to incorporate the light-shielding substance, especially 0.3 to 30% of oil furnace carbon black having a pH value of 5 to 9 in the L-LDPE layer.

In this case, the amount of L-LDPE is 45 to 99.7% optionally with 0 to 54.7% of other thermoplastic resin.

EXAMPLES

The present invention will now be explained further with reference to the following non-restrictive examples.

Three types of the invented laminated films of the structure as shown in Table 1 were prepared, and three types of prior art samples were made for the purpose of comparative testing. The molecularly-oriented film layers applied on the outer sides (to be not heat-sealed) were the uniaxially and obliquely stretched films having a magnification of stretch of 3.0 times obtained from a high-density polyethylene having a density of 0.96 g/cm$^3$ with the use of the apparatus as disclosed in Japanese Kokoku Publication No. 53-18072. The low-pressure-processed, linear low-density polyethylene (L-LDPE) film layers applied on the inner side (to be heat-sealed) were the inflation films formed at a blow-up ratio of 1.2 from L-LDPE resin (ULTZ EX manufactured by Mitsui Petroleum Chemical Ind., Grade No. 2020L) in which the alpha-olefin was 4-methylpentene-1, and which had a density of 0.923 g/cm$^3$ and a melt index of 2.5 g/10 min. The foamed styrene sheets used as the foamed sheet layers had a foaming magnification of 20 times, and bonding was effected at 310° C. through the extrusion adhesive layers. The compression rate was respectively (1) 60%, (2) 53%, (3) 47%, (4) 57% and (5) 48% with the residual thickness ratio being (1) 40%, (2) 47%, (3) 53%, (4) 43% and (5) 52% in that order.

As a result of testing, it has been found that the three laminated films according to the present invention are all prominently improved in respect of resistance to curling, tear strength, impact perforation strength, Gelbo test strength and drop strength. Inventive sample 2 has two layers added to Inventive sample 1, but is not appreciably improved from sample 1 in respect of impact perforation strength. However, it has been noted that the sample 2 is considerably reduced from −450 V to −23 V with respect to peeling electrostatic voltage, which means that it is very suitable for use as the packaging material.

It should be noted that the present invention may be worked in the practice with modifications apparent in the art without departing from the gist of the present invention as herein disclosed and claimed as accompanying.

TABLE 1

| | Unit | Prior Art Sample 1 | Prior Art Sample 2 | Prior Art Sample 3 | Inventive Sample 1 | Inventive Sample 2 |
|---|---|---|---|---|---|---|
| Total Thickness | μm | 200 | 147 | 115 | 253 | 342 |
| Structure | μm | | | | | as left |
| 1st Layer (to be Heat-sealed) | | LDPE Film 50(C3) | LDPE Film 70(C3) | Uniaxially and Obliquely Stretched High-density Polyethylene Film (containing 4.5% of Carbon) 40 | Low-pressure-processed, Linear Low-density Polyethylene Film (containing 3% of Carbon) 50 | |
| 2nd Layer (Hot-melt Adhesive Layer) | μm | LDPE 15 | as left | as left | LDPE 15 | as left |
| 3rd Layer | μm | Aluminum Foil 7 | as left | as left | Foamed Styrene 500 | as left 500 |
| 4th Layer (Hot-melt Adhesive Layer) | μm | LDPE 15 | as left | as left | LDPE 15 | as left |
| 5th Layer (to be not Heat-sealed) | μm | Kraft Paper (35 g/m$^2$) 43 μm | as left | Uniaxially and Obliquely Stretched High-density Polyethylene Film (containing 4.5% of Carbon) 40 | Uniaxially and Obliquely Stretched High-density Polyethylene Film (containing 4.5% of Carbon) 40 | as left |
| 6th Layer (Hot-melt Adhesive Layer) | μm | LDPE 15 | — | — | — | LDPE 15 |
| 7th Layer | μm | LDPE 50(C3) | — | — | — | Kraft Paper (70 g/m$^2$) 85 μm |
| Compression Rate | | — | — | — | 60% (1) | 53% (2) |
| Residual Thickness Ratio | | — | — | — | 40% | 47% |
| Tear Strength | g | | | | | |
| Longitudinal | | 294 | 146 | 343 | 479 | 812 |
| Transverse | | 610 | 258 | 496 | uncut | uncut |
| Impact Perforation Strength | kg · cm | | | | | |
| Front | | 5.1 | 3.8 | 9.3 | 21.2 | 23.6 |
| Back | | 5.8 | 6.1 | 10.6 | 19.3 | 22.1 |
| Curling | | Good | Bad | Bad | Excellent | Excellent |
| Gelbo Test Strength | cm times | (2.5) | (14) | (8.7) | (1.1) | (1.5) |
| Drop Strength | times | 18 1 | 5 1 | 16 3 | ≧300 12 | 200~300 16 |
| Heat-sealability | | C | C | C | A | A |

| | Unit | Inventive Sample 3 | Control Sample 1 | Control Sample 2 | Testing Method |
|---|---|---|---|---|---|
| Total Thickness | μm | 596 | 258 | 328 | JISK6301 |
| Structure | μm | as left | | | JISK6301 |
| 1st Layer (to be Heat-sealed) | | | LDPE Film 50 (C3) | Uniaxially and Obliquely Stretched High-density Polyethylene Film (containing 4.5% of Carbon) | |

TABLE 1-continued

|  |  |  |  | 40 |  |  |
|---|---|---|---|---|---|---|
| 2nd Layer (Hot-melt Adhesive Layer) | μm | as left | LDPE 15 | as left | JISK6301 |
| 3rd Layer | μm | as left 1000 | Foamed Styrene 500 | as left | JISK6301 |
| 4th Layer (Hot-melt Adhesive Layer) | μm | as left | LDPE 15 | as left | JISK6301 |
| 5th Layer (to be not Heat-sealed) | μm | as left | Uniaxially and Obliquely Stretched High-density Polyethylene Film (containing 4.5% of Carbon) 40 | as left | JISK6301 |
| 6th Layer (Hot-melt Adhesive Layer) | μm | — | — | — | JISK6301 |
| 7th Layer | μm | — | — | — | JISK6301 |
| Compression Rate |  | 47% (3) | 57% (4) | 48% (5) |  |
| Residual Thickness Ratio |  | 53% | 43% | 52% |  |
| Tear Strength | g |  |  |  |  |
| Longitudinal |  | 534 | 186 | 403 | JISP8136 |
| Transverse |  | uncut | 419 | uncut | JISP8136 |
| Impact Perforation Strength | kg·cm |  |  |  |  |
| Front |  | 26.2 | 11.1 | 13.8 | JISP8134 |
| Back |  | 24.7 | 12.2 | 14.0 | JISP8134 |
| Curling | cm | Excellent | 200 | 200 | (10-1)cm |
| Gelbo Test Strength | times | (0.7) | 5 | 10 | (6) |
| Drop Strength | times | ≧300 13 |  |  | (7) |
| Heat-sealability |  | A | C | C | (8) |

Note:
(C3): containing 3% Carbon Black
LDPE: Low-density Polyethylene (1) $\left(1 - \frac{253}{630}\right) \times 100 = 60\%$ (2) $\left(1 - \frac{342}{730}\right) \times 100 = 53\%$ (3) $\left(1 - \frac{596}{1130}\right) \times 100 = 47\%$ (4) $\left(1 - \frac{273}{630}\right) \times 100 = 57\%$ (5) $\left(1 - \frac{318}{610}\right) \times 100 = 48\%$ (6) Gelbo Test Strength Measurement: According to Military Specification MIL B 131 (Testing Method for Flexible Moistureproof Barrier Material)
(7) Drop Strength Measurement: Rolled articles (films) weighing 5 kg are changed in threeside-sealed flat bags (sealed width: 10 mm) through their open ends, said bags being formed of various laminated film samples. The open ends are folded three times, and are sealed with adhesive-backed tapes. The bags are then dropped from a height of 1 m onto the floor to determine the number of cycles by the time the laminated films are holed by the corner edges of the rolled articles.
(8) Heat-sealability: Determined by the overall estimation of Hot-tack strength, Low-temperature, Heat-sealability and Heat-seal Strength
A: Very Excellent.
B: Good.
C: Practical Limit

I claim:

1. A laminated film comprising a foamed sheet, a molecularly-oriented thermoplastic resin film layer laminated onto one side of the foamed sheet and a low-pressure-processed, linear low-density polyethylene (L-LDPE) film layer laminated onto the other side of the foamed sheet, wherein:
   (a) said foamed sheet has a thickness of 0.3 to 2.0 mm and a foaming magnification of 5 to 50 times,
   (b) said molecularly-oriented thermoplastic resin film has a thickness of 5 to 120 microns, and
   (c) said L-LDPE film layer has a thickness of 13 to 120 microns, the latter two being melt-bonded to each side of said foamed sheet through adhesive layers, respectively; and
   (d) the resultant laminated film has a thickness reduced to 25 to 85% of the theoretical sum of the individual original layers.

2. A laminated film as defined in claim 1, in which said foamed sheet is formed of one or more selected from the group consisting of polyethylene, polypropylene, polystyrene, polyurethane, copolymers thereof, and copolymers and blends thereof with at least one of other resins.

3. A laminated film as defined in claim 1, in which at least one of said foamed sheet, said molecularly-oriented thermoplastic resin film layer, said L-LDPE film layer and said adhesive layers contains a light-shielding substance.

4. A laminated film as defined in claim 1, in which said molecularly-oriented thermoplastic resin film layer has a melting point higher than that of said L-LDPE film layer by at least 10° C.

5. A laminated film as defined in claim 1, in which said molecularly-oriented thermoplastic resin film layer is a uniaxially or biaxially oriented film.

6. A laminated film as defined in claim , in which said L-LDPE film layer comprises at least a polyethylenic polymer and 0.3% by weight or more of a light-shielding substance, 45% by weight or more of said polyethylenic polymer being a low-pressure-processed, linear low-density polyethylene (L-LDPE), and the balance being at least one thermoplastic resin other than L-LDPE.

7. A laminated film as defined in claim 1, in which the laminated film is a packaging material for photosensitive materials, and containing a total amount of 0.5 to 15 g/m² of a light-shielding substance in the laminated layers.

8. A laminated film as defined in claim 1, in which an additional flexible sheet layer is laminated onto the outer side of said molecularly-oriented film, said sheet layer having a heat resistance higher than that of said molecularly-oriented film by at least 10° C.

9. A laminated film as defined in claim 1, which is designed for the packaging of photosensitive material, and in which a paper layer having a thickness of no less than 30 microns is further laminated onto the outer side of said molecularly-oriented film, the paper layer serving as at least any of the light-shielding layer and the heat-resistant layer.

10. A laminated film as defined in claim 1, which is designed for the packaging of photosensitive materials, and in which;

said uniaxially molecularly-oriented film is a uniaxially stretched film of a high-density polyethylene having a density of no less than 0.94 g/cm³ and a magnification of stretch of 2 to 6 times and containing 1 to 7% by weight of carbon black, said adhesive layers are formed of a polyolefinic thermoplastic resin, and are melt-bonded at 230° to 380° C., and said formed sheet is substantially composed of polyethylene, polypropylene, polystyrene or a mixture thereof.

11. A laminated film as defined in claim 1, which is designed for the packaging of photosensitive materials and said L-LDPE film layer comprises oil furnace carbon black having a pH of 7±2 as light-shielding substance.

12. A laminated film as defined in claim 1, which is designed for the packaging of photosensitive materials, and in which:

said uniaxially molecularly-oriented film is a uniaxially and obliquely stretched film of a high-density polyethylene having a density of no less than 0.94 g/cm³, a magnification of stretch of 2 to 6 times and a thickness of 15 to 70 microns, and containing 1 to 7% by weight of carbon black, said L-LDPE film layer is composed of 45 to 99.7% by weight of an L-LDPE resin, 0.3 to 30% by weight of oil furnace carbon black having a pH of 7±2, and contains 0 to 54.7% by weight of at least one of thermoplastic resins other than L-LDPE, said adhesive layers are formed of a polyolefinic thermoplastic resin, and are melt-bonded at 230° to 380° C., and said foamed sheet is substantially composed of polyethylene, polypropylene, polystyrene or a mixture thereof.

13. A laminated film as defined in claim 2, in which said other resins are thermoplastic resins.

14. A laminated film as defined in claim 13, in which said thermoplastic resins are olefinic resins.

15. A laminated film as defined in claim 14, in which said blends comprise at least 50% by weight of any of polyethylene, polypropylene or polyurethane.

* * * * *